US011916341B2

(12) United States Patent
Minnick et al.

(10) Patent No.: US 11,916,341 B2
(45) Date of Patent: Feb. 27, 2024

(54) DIRECT PLUG ORTHOGONAL BOARD TO BOARD CONNECTOR SYSTEM

(71) Applicant: TE Connectivity Services GmbH, Schaffhausen (CH)

(72) Inventors: Timothy Robert Minnick, Enola, PA (US); Justin Dennis Pickel, Hummlestown, PA (US); Chad William Morgan, Carneys Point, NJ (US); David Allison Trout, Lancaster, PA (US); Jeffrey Byron McClinton, Harrisburg, PA (US)

(73) Assignee: TE CONNECTIVITY SOLUTIONS GMBH, Schaffhausen (CH)

( * ) Notice: Subject to any disclaimer, the term of this patent is extended or adjusted under 35 U.S.C. 154(b) by 182 days.

(21) Appl. No.: 17/404,099

(22) Filed: Aug. 17, 2021

(65) Prior Publication Data

US 2023/0057831 A1 Feb. 23, 2023

(51) Int. Cl.

| | |
|---|---|
| ***H01R 24/84*** | (2011.01) |
| ***H01R 13/6587*** | (2011.01) |
| *H01R 12/71* | (2011.01) |
| *H01R 12/72* | (2011.01) |
| *H01R 12/73* | (2011.01) |
| *H01R 107/00* | (2006.01) |

(52) U.S. Cl.

CPC ......... *H01R 24/84* (2013.01); *H01R 13/6587* (2013.01); *H01R 12/716* (2013.01); *H01R 12/724* (2013.01); *H01R 12/737* (2013.01); *H01R 2107/00* (2013.01)

(58) Field of Classification Search

CPC ................ H01R 24/84; H01R 13/6587; H01R 13/6581; H01R 13/658; H01R 13/648; H01R 12/716; H01R 12/724; H01R 12/704; H01R 12/70; H01R 12/737; H01R 12/735

See application file for complete search history.

(56) References Cited

U.S. PATENT DOCUMENTS

| | | | | |
|---|---|---|---|---|
| 8,157,591 | B2 * | 4/2012 | Fedder | H01R 13/514 439/108 |
| 8,366,485 | B2 * | 2/2013 | Johnescu | H01R 12/737 439/607.09 |
| 8,398,431 | B1 * | 3/2013 | Whiteman, Jr. | H01R 13/6587 439/607.06 |
| 8,419,472 | B1 * | 4/2013 | Swanger | H01R 13/6587 439/607.07 |
| 8,771,017 | B2 * | 7/2014 | Vino, IV | H01R 13/6587 439/607.56 |
| 9,742,088 | B1 * | 8/2017 | Pickel | H01R 13/6471 |

(Continued)

*Primary Examiner* — Harshad C Patel

(57) ABSTRACT

An electrical connector includes wafer assemblies coupled to a housing. Each wafer assembly includes a leadframe, a wafer body holding the leadframe, and a ground frame coupled to the wafer body to provide electrical shielding for the leadframe. Each leadframe has signal contacts with mating ends extending from the wafer body for mating with mating signal contacts of a mating electrical connector. The mating ends are twisted 45° to define twisted mating interfaces. Each ground frame has ground shields extending from a ground plate along the mating ends of the signal contacts. The ground shields are twisted 45° relative to the ground plate to define twisted shield zones along the mating ends of the signal contacts.

19 Claims, 7 Drawing Sheets

(56) References Cited

U.S. PATENT DOCUMENTS

| | | | | |
|---|---|---|---|---|
| 9,985,389 | B1 * | 5/2018 | Morgan | H01R 13/6471 |
| 10,084,264 | B1 * | 9/2018 | Zhou | H01R 13/6461 |
| 10,186,811 | B1 * | 1/2019 | Trout | H01R 13/428 |
| 10,498,100 | B1 * | 12/2019 | Trout | H01R 13/6587 |
| 10,741,950 | B1 * | 8/2020 | Consoli | H01R 12/727 |
| 10,868,392 | B2 * | 12/2020 | Rossman | H01R 13/6587 |
| 11,018,456 | B2 * | 5/2021 | Trout | H01R 13/514 |
| 2010/0144169 | A1 * | 6/2010 | Glover | H01R 13/6471<br>439/78 |
| 2011/0081809 | A1 * | 4/2011 | Morgan | H05K 1/0219<br>174/262 |
| 2013/0273781 | A1 * | 10/2013 | Buck | H01R 13/516<br>439/626 |

* cited by examiner

DIRECT PLUG ORTHOGONAL BOARD TO BOARD CONNECTOR SYSTEM

BACKGROUND OF THE INVENTION

The subject matter herein relates generally to electrical connectors for a communication system.

Communication systems use electrical connectors to electrically connect various components to allow data communication between the components. For example, in a direct plug orthogonal system, electrical connectors of circuit board assemblies are directly mated together with the circuit boards oriented perpendicular to each other. The signal conductors of the two electrical connectors transition between the two, perpendicular circuit boards. For high speed connectors, shielding is required, adding to the complexity of the connector designs. Typically, both connectors are designed differently to transition from the respective circuit boards. The design and manufacture of such systems are expensive because it requires tooling investments for two individual right angle connector designs. Some systems use a third adapter connector between the first and second connectors adding additional expense to the system.

A need remains for a cost effective and reliable electrical connector for a direct plug orthogonal system.

BRIEF DESCRIPTION OF THE INVENTION

In one embodiment, an electrical connector is provided and includes a housing having a mating interface configured to be mated with a mating electrical connector. The electrical connector includes wafer assemblies coupled to the housing and arranged in a wafer stack. Each wafer assembly includes a leadframe, a wafer body holding the leadframe, and a ground frame coupled to the wafer body to provide electrical shielding for the leadframe. Each leadframe has signal contacts extending between mating ends and mounting ends. The signal contacts have main bodies between the mating ends and the mounting ends. The main bodies extend through the wafer bodies. The mounting ends extend from the wafer body for termination to a circuit board. The mating ends extend from the wafer body and are presented at the mating interface of the housing for mating with mating signal contacts of the mating electrical connector. The mating ends are twisted 45° relative to the main bodies to define twisted mating interfaces configured to be mated with the mating signal contacts of the mating electrical connector. Each ground frame has a ground plate coupled to the wafer body and ground shields extending forward from the ground plate. The ground shields extend along the mating ends of the corresponding signal contacts to provide shielding for the mating ends along the mating interfaces. The ground shields are twisted 45° relative to the ground plate to define twisted shield zones along the mating ends of the signal contacts.

In another embodiment, an electrical connector is provided and includes a housing having a mating interface configured to be mated with a mating electrical connector. The housing includes a contact organizer having signal contact openings and ground shield openings. The housing includes a commoning member at the mating interface. The commoning member is conductive and provides electrical shielding at the mating interface. The commoning member has openings aligned with the ground shield openings. The electrical connector includes wafer assemblies coupled to the housing and arranged in a wafer stack. Each wafer assembly includes a leadframe, a wafer body holding the leadframe, and a ground frame coupled to the wafer body to provide electrical shielding for the leadframe. Each leadframe has signal contacts extending between mating ends and mounting ends. The signal contacts have main bodies between the mating ends and the mounting ends. The main bodies extend through the wafer bodies. The mounting ends extend from the wafer body for termination to a circuit board. The mating ends extend from the wafer body into corresponding signal contact openings of the contact organizer. The mating ends are presented at the mating interface of the housing for mating with mating signal contacts of the mating electrical connector. The mating ends are twisted 45° relative to the main bodies to define twisted mating interfaces configured to be mated with the mating signal contacts of the mating electrical connector. Each ground frame has a ground plate coupled to the wafer body and ground shields extending forward from the ground plate. The ground shields are received in corresponding ground shield openings of the contact organizer and extending into the corresponding opening in the commoning member. The ground shields are electrically connected to the commoning member such that each of the ground shields are electrically commoned by the commoning member. The ground shields extend along the mating ends of the corresponding signal contacts to provide shielding for the mating ends along the mating interfaces. The ground shields are twisted 45° relative to the ground plate to define twisted shield zones along the mating ends of the signal contacts.

In a further embodiment, a communication system is provided and includes a first circuit board assembly having a first circuit board and a first electrical connector mounted to the first circuit board. The first electrical connector has first signal contacts and first ground shields providing electrical shielding for the first signal contacts at mating ends of the first signal contacts. The communication system includes a second circuit board assembly having a second circuit board and a second electrical connector mounted to the second circuit board. The second electrical connector has second signal contacts and second ground shields providing electrical shielding for the second signal contacts at mating ends of the second signal contacts. The first and second electrical connectors are identical to each other. Each has a hermaphroditic mating interface defined by the first and second signal contacts and the first and second ground shields. The first and second electrical connectors are mated such that the first circuit board is oriented perpendicular to the second circuit board.

DETAILED DESCRIPTION OF THE INVENTION

Figure 1:
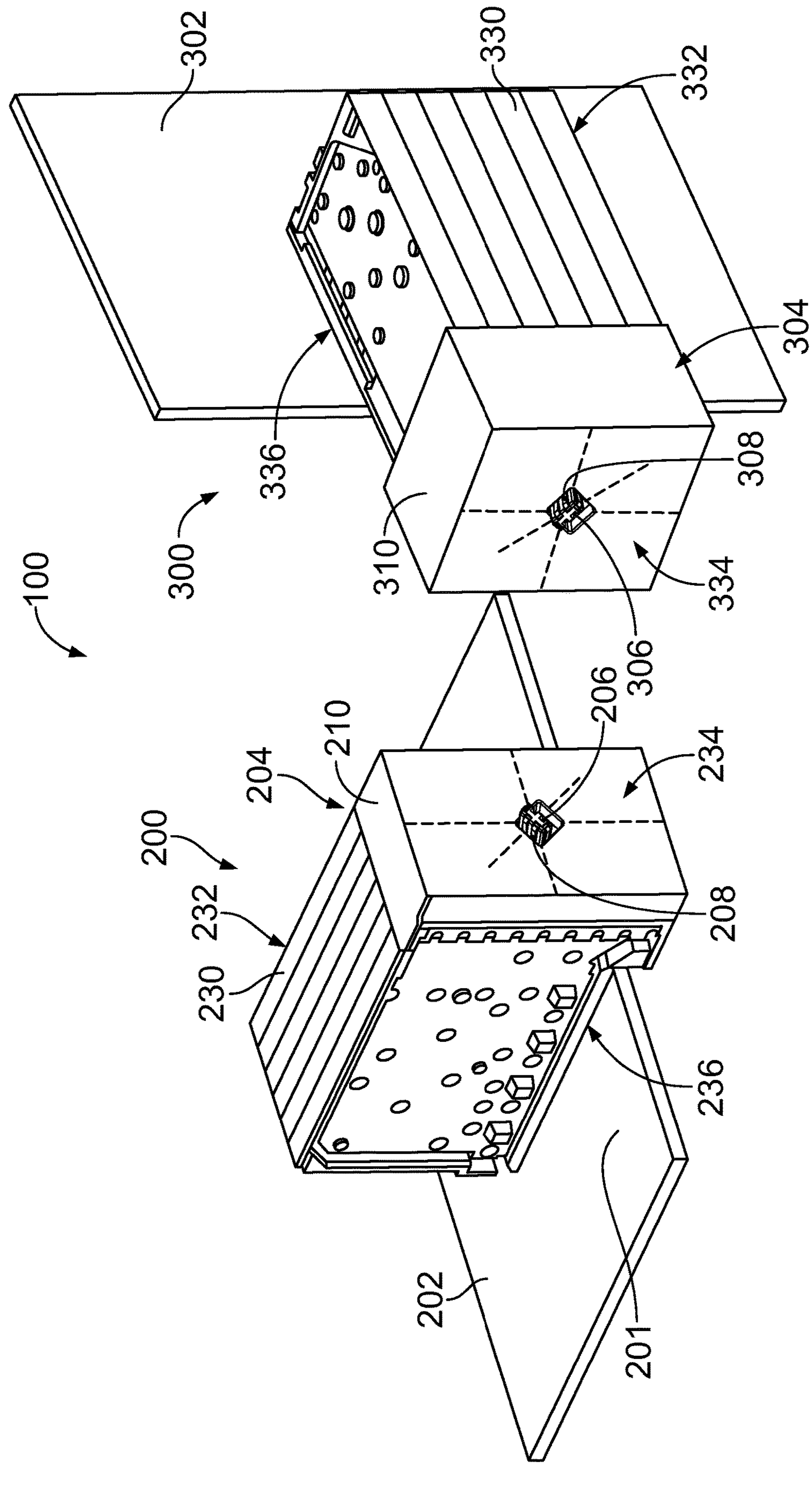
FIG. 1 illustrates a communication system in accordance with an exemplary embodiment.

FIG. 1 illustrates a communication system 100 in accordance with an exemplary embodiment. The communication system 100 includes a first circuit board assembly 200 and the second circuit board assembly 300 configured to be electrically coupled together. In various embodiments, the communication system may be a server or network switch. In other various embodiments, the communication system 100 may be a backplane system. The first circuit board assembly 200 and/or the second circuit board assembly 300 may be a backplane assembly. The first circuit board assembly 200 and/or the second circuit board assembly 300 may be a daughtercard assembly. The first circuit board assembly 200 and/or the second circuit board assembly 300 may be a motherboard assembly.

In an exemplary embodiment, the first and second circuit board assemblies 200, 300 are directly mated together. For example, the first circuit board assembly 200 may be plugged into the second circuit board assembly 300 and/or the second circuit board assembly 300 may be plugged into the first circuit board assembly 200. The first and second circuit board assemblies 200, 300 are mated at a separable mating interface. The first and second circuit board assemblies 200, 300 are directly mated together without the use of an adapter or additional electrical connector therebetween.

The first circuit board assembly 200 includes a first circuit board 202 and a first electrical connector 204 mounted to the first circuit board 202. The first electrical connector 204 includes first signal contacts 206 and first ground shields 208 provide electrical shielding for the first signal contacts 206.

The second circuit board assembly 300 includes a second circuit board 302 and a second electrical connector 304 mounted to the second circuit board 302. The second electrical connector 304 includes second signal contacts 306 and second ground shields 308 providing electrical shielding for the second signal contacts 306.

The first and second electrical connectors 204, 304 are identical to each other each having a hermaphroditic mating interface defined, at least in part, by the signal contacts 206, 306 and the ground shields 208, 308. In an exemplary embodiment, the signal contacts 206, 306 are twisted 45° and the ground shields 208, 308 are twisted 45° to form the identical, hermaphroditic mating interfaces. Twisting the signal contacts 206, 306 and the ground shields 208, 308 allows the electrical connectors 204, 304 to be oriented at right angles relative to each other. In an exemplary embodiment, the communication system 100 is a direct plug orthogonal communication system. In the direct plug orthogonal communication system, the first circuit board 202 is oriented orthogonal or perpendicular to the second circuit board 302.

The signal contacts 206, 306 define electrical paths between the circuit boards 202, 302. The signal contacts 206, 306 both have twisted mating interfaces that mate at the separable mating interface between the first and second electrical connectors 204, 304. The 45° twists in the signal contacts 206, 306 combine to form the 90° transition between the circuit boards 202, 302 and allow the electrical connectors 204, 304 to be at right angles relative to each other. In an exemplary embodiment, the ground shields 208, 308 also include the 45° twists to provide twisted shield zones along the mating ends of the signal contacts 206, 306. The twisted shield zones provide uniform shielding for the signal contacts 206, 306 as the signal contacts 206, 306 form the 90° transition between the electrical connectors 204, 304.

In an exemplary embodiment, the first electrical connector 204 is mounted to a mounting surface 201 of the first circuit board 202. The first electrical connector 204 may be mounted to the first circuit board 202 at or proximate to an edge 202 of the first circuit board 202. The first circuit board 202 has a first circuit board plane defined by the surface 201. The first electrical connector 204 extends outward from the surface 201. The mating interface of the first electrical connector 204 is oriented perpendicular to the surface 201. For example, in various embodiments, the first circuit board 202 may be oriented horizontally and the mating interface of the first electrical connector 204 may be oriented vertically. Other orientations are possible in alternative embodiments.

The first electrical connector 204 includes a housing 210 having a mating interface configured to be mated with the second electrical connector 304. The mating interface is provided at a front of the housing 210. In an exemplary embodiment, the first electrical connector 204 includes a plurality of wafers assemblies 230 coupled to the housing 210. The wafer assemblies 230 include the signal contacts 206 and the ground shields 208. The wafer assemblies 230 are configured to be coupled to the first circuit board 202. For example, the signal contacts 206 may include compliant pins or press-fit pins configured to be press-fit into plated vias of the first circuit board 202. Alternatively, the signal contacts 206 may be soldered to solder pads of the first circuit board 202. In an exemplary embodiment, the wafer assemblies 230 are oriented perpendicular to the mounting surface 201 of the first circuit board 202. For example, the wafer assemblies 230 generally extend along wafer planes that are perpendicular to the circuit board plane of the first circuit board 202.

In an exemplary embodiment, the wafer assemblies 230 are arranged in a wafer stack 232. For example, the wafer assemblies 230 are parallel to each other in the wafer stack 232. The wafer stack 232 extends from a rear of the housing 210. Optionally, the wafer assemblies 230 may be individually loaded into the housing 210, such as into a cavity at a rear of the housing 210. Alternatively, the wafer assemblies 230 may be assembled together in the wafer stack 232 and the wafer stack 232 is loaded into the rear of the housing 210.

In an exemplary embodiment, each wafer assembly 230 extends between a mating end 234 and a mounting end 236 the mounting end 236 is configured to be mounted to the first circuit board 202. The mating end 234 extends into the housing 210 and is configured to be mated with the second electrical connector 304. The signal contacts 206 transition between the mounting end 236 and the mating end 234. In an exemplary embodiment, the wafer assembly 230 is a right-angle wafer assembly having the mating end 234 at a right angle relative to the mounting end 236. For example, the mounting end 236 may be at a bottom of the wafer assembly 230 and the mating end 234 may be at a front of the wafer assembly 230. The ground shields 208 are provided at the mating end 234 and are configured to be mated with the second ground shields 308. In an exemplary embodiment, the signal contacts 206 and the ground shields 208 are twisted 45° at the mating end 234 for mating with the second electrical connector 304.

In an exemplary embodiment, the second electrical connector 304 is mounted to a mounting surface of the second circuit board 302. The second electrical connector 304 may be mounted to the second circuit board 302 at or proximate to an edge 312 of the second circuit board 302. The second circuit board 302 has a second circuit board plane defined by the surface. The second electrical connector 304 extends outward from the surface. The mating interface of the second electrical connector 304 is oriented perpendicular to the surface.

The second electrical connector 304 includes a housing 310 having a mating interface configured to be mated with the first electrical connector 204. The mating interface is provided at a front of the housing 310. In an exemplary embodiment, the second electrical connector 304 includes a plurality of wafers assemblies 330 coupled to the housing 310. The wafer assemblies 330 include the signal contacts 306 and the ground shields 308. The wafer assemblies 330 are configured to be coupled to the second circuit board 302. For example, the signal contacts 306 may include compliant pins or press-fit pins configured to be press-fit into plated vias of the second circuit board 302. Alternatively, the signal contacts 306 may be soldered to solder pads of the second circuit board 302. In an exemplary embodiment, the wafer assembly 330 are oriented perpendicular to the mounting surface of the second circuit board 302. For example, the wafer assemblies 330 generally extend along wafer planes that are perpendicular to the circuit board plane of the second circuit board 302.

In an exemplary embodiment, the wafer assemblies 330 are arranged in a wafer stack 332. For example, the wafer assemblies 330 are parallel to each other in the wafer stack 332. The wafer stack 332 extends from a rear of the housing 310. Optionally, the wafer assemblies 330 may be individually loaded into the housing 310, such as into a cavity at a rear of the housing 310. Alternatively, the wafer assemblies 330 may be assembled together in the wafer stack 332 and the wafer stack 332 is loaded into the rear of the housing 310.

In an exemplary embodiment, each wafer assembly 330 extends between a mating end 334 and a mounting end 336 the mounting end 336 is configured to be mounted to the second circuit board 302. The mating end 334 extends into the housing 310 is configured to be mated with the first electrical connector 204. The signal contacts 306 transition between the mounting end 336 and the mating end 334. In an exemplary embodiment, the wafer assembly 330 is a right-angle wafer assembly having the mating end 334 at a right angle relative to the mounting end 336. For example, the mounting end 336 may be at a bottom of the wafer assembly 330 and the mating end 334 may be at a front of the wafer assembly 330. The ground shields 308 are provided at the mating end 334 and are configured to be mated with the first ground shields 208. In an exemplary embodiment, the signal contacts 306 and the ground shields 308 are twisted 45° at the mating end 334 for mating with the first electrical connector 204.

Figure 2:
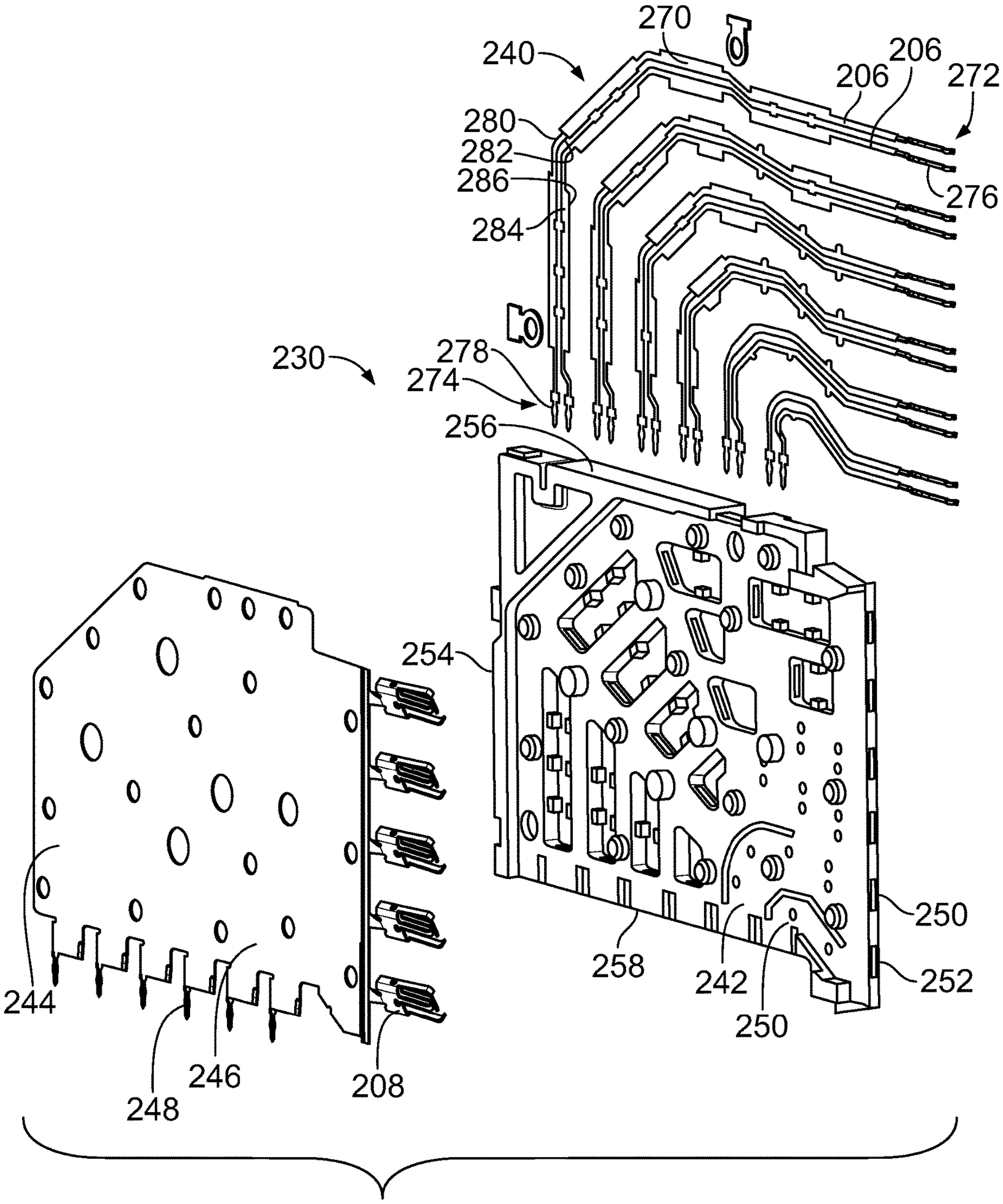
FIG. 2 is an exploded view of the wafer assembly in accordance with an exemplary embodiment.

FIG. 2 is an exploded view of the wafer assembly 230 in accordance with an exemplary embodiment. In an exemplary embodiment, the wafer assembly 230 is identical to the wafer assembly 330 (shown in FIG. 1) with both wafer assemblies 230, 330 including identical components.

The wafer assembly 230 includes a lead frame 240, a wafer body 242 holding the lead frame 240, and a ground frame 244 coupled to the wafer body 242 to provide electrical shielding for the lead frame 240. The lead frame 240 includes the signal contacts 206. The lead frame 240 may be stamped and formed from a metal sheet. In an exemplary embodiment, the lead frame 240 only includes the signal contacts 206. However, in alternative embodiments, the lead frame 240 may include ground contacts arranged between corresponding signal contacts to provide electrical shielding for the signal contacts. In an exemplary embodiment, the signal contacts 206 are arranged in pairs configured to carry differential signals. However, the signal contacts 206 may be single ended signal contacts in alternative embodiments.

The wafer body 242 surrounds the signal contacts 206 and positions the signal contacts 206 relative to each other. In an exemplary embodiment, the wafer body 242 is manufactured from a dielectric material, such as a plastic material. In an exemplary embodiment, the wafer body 242 is an overmold that is overmolded around the lead frame 240. The wafer body 242 includes sides 250 extending between a front 252 and a rear 254 and extending between a top 256 and a bottom 258. The bottom 258 defines a mounting end and the front 252 defines a mating end. The signal contacts 206 extend from the wafer body 242 at the bottom 258 for connection to the circuit board 202 (shown in FIG. 1). The signal contacts 206 extend from the wafer body 242 at the front 252 for connection to the second electrical connector 304 (shown in FIG. 1). In an exemplary embodiment, the signal contacts 206 are twisted 45° forward of the wafer body 242 for mating with the second electrical connector 304.

The ground frame 244 provides a shield structure for the signal contacts 206. In an exemplary embodiment, the ground frame 244 includes a ground plate 246 forming a main body of the ground frame 244. The ground shields 208 extend from the ground plate 246, such as a front of the ground plate 246. The ground shields 208 are twisted 45° forward of the ground plate 246 for mating with the second electrical connector 304. The ground plate 246 is configured to be coupled to one of the sides 250 of the wafer body 242. In an exemplary embodiment, the ground plate 246 is generally planar. The ground frame 244 includes pins 248 extending from the bottom of the ground plate 246. The pins 248 are configured to be coupled to the first circuit board 202. For example, the pins 248 may be compliant pins configured to be press-fit into plated vias of the first circuit board 202 to electrically connect the ground frame 244 to a ground plane of the first circuit board 202. Optionally, the wafer assembly 230 may include ground frames 244 on each side of the wafer body 242. One or both of the ground frames 244 may include the ground shields 208. The ground frames 244 may be connected to each other through the wafer body 242, such as using grounding tabs.

Each signal contact 206 includes a main body 270 extending between a mating end 272 and a mounting end 274. In the illustrated embodiment, the signal contact 206 is a right-angle contact with the main body 270 extending through a generally 90° transition between the mating end 272 and the mounting end 274. The mating end 272 is generally perpendicular to the mounting end 274. In an exemplary embodiment, the main body 270 is stamped and formed as part of the lead frame 240. When stamped, the main body 270 has first and second edges 280, 282 extending between first and second sides 284, 286. The edges 280, 282 are the cut edges made during the stamping process. The sides 284, 286 are the main, opposed surfaces of the metal sheet from which the signal contact 206 is stamped. The main bodies 270 of the lead frame 240 are arranged in a lead frame plane parallel to the sides 284, 286. The signal contact 206 includes a spring beam 276 at the mating end 272 and a pin 278 at the mounting end 274. The spring beam 276 is deflectable and configured to be mated with a corresponding spring beam of the second signal contact 306 (shown in FIG. 1). The mating end 272 (for example, the spring beam 276 at the mating end 272) is twisted 45° relative to the main body 270 for mating with the second signal contact 306. The spring beam 276 is twisted such that the mating end 272 is offset or angled 45° relative to the lead frame plane.

Figure 3:
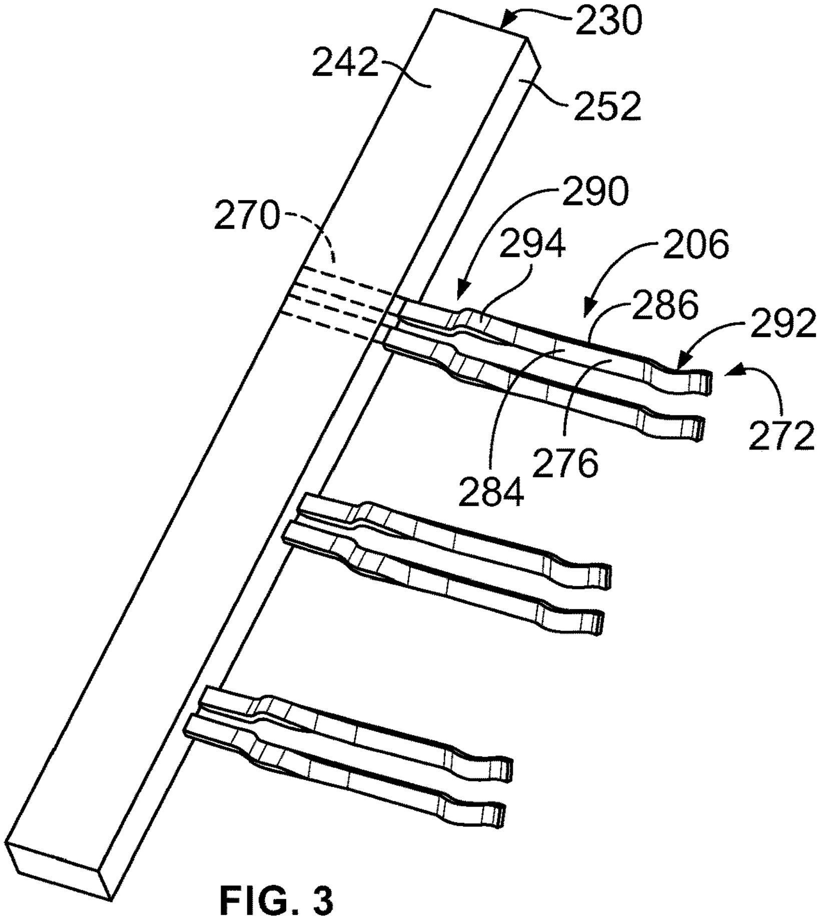
FIG. 3 is a perspective view of a portion of the wafer assembly in accordance with an exemplary embodiment.

FIG. 3 is a perspective view of a portion of the wafer assembly 230 in accordance with an exemplary embodiment. FIG. 3 illustrates a plurality of the signal contacts 206 extending from the wafer body 242. The signal contacts 206 are arranged in pairs. The mating ends 272 extend from the front 252 of the wafer body 242. Each mating end 272 includes a transition portion 290 at a root of the mating end 272 and a mating finger 292 at a tip of the mating end 272. The spring beam 276 extends between the transition portion 290 and the mating finger 292. In the illustrated embodiment, the mating finger 292 includes a bump defining a mating interface of the mating end 272. The mating finger 292 may have other shapes in alternative embodiments.

The transition portion 290 includes a twist portion 294. The twist portion 294 positions the spring beam 276 out of plane relative to the lead frame plane. The twist portion 294 orients the spring beam 276 at 45° relative to the lead frame plane. The sides 284, 286 along the mating end 272 are angled 45° relative to the sides 284, 286 along the main body 270. In an exemplary embodiment, within each differential pair the first sides 284 of the each of the signal contacts 206 are coplanar and the second sides 286 of each of the signal contacts 206 are coplanar. However, the twist portions 294 rotate the mating ends 272 out of plane relative to the main bodies 270. The first sides 284 along the mating ends 272 are oriented at 45° relative to the first sides 284 along the main bodies 270 and the second sides 286 along the mating ends 272 are oriented at 45° relative to the second sides 286 along the main bodies 270. In an exemplary embodiment, the mating ends 272 of the signal contacts 206 within each pair are transitioned in different directions. For example, the mating ends 272 of the signal contacts 206 are twisted such that one of the signal contacts 206 of the pair is on a right side of the lead frame plane and the other signal contacts 206 of the pair is on a left side of the lead frame plane.

Figure 4:
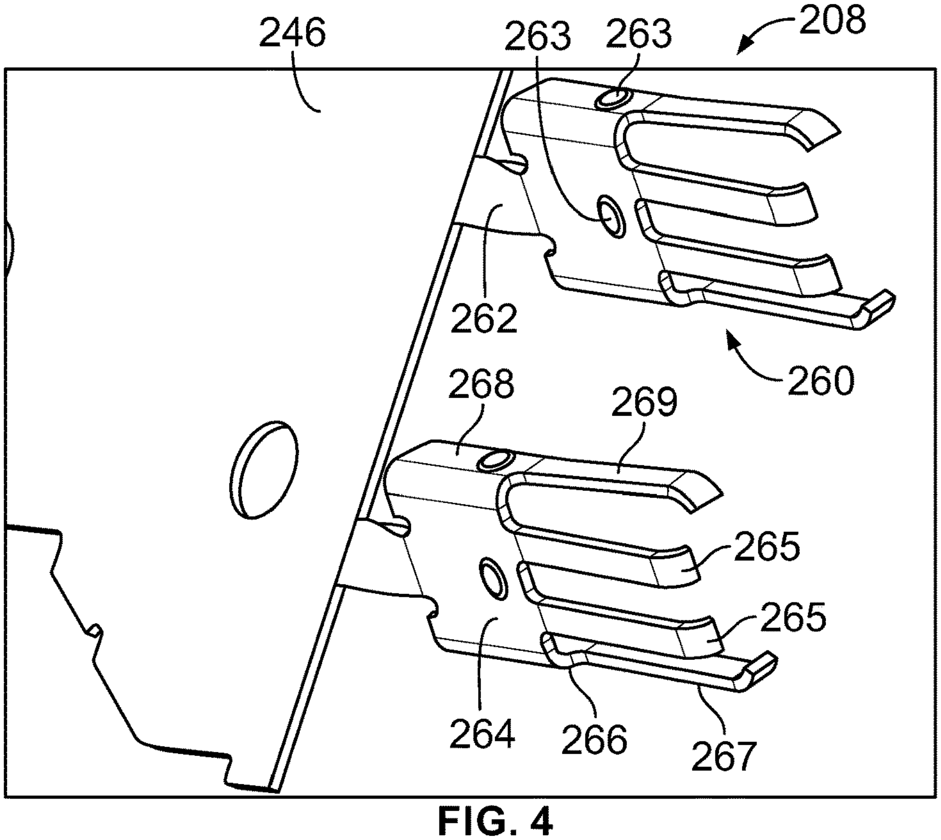
FIG. 4 is a perspective view of a portion of the wafer assembly in accordance with an exemplary embodiment.

FIG. 4 is a perspective view of a portion of the wafer assembly 230 in accordance with an exemplary embodiment. FIG. 4 illustrates a plurality of the ground shields 208 extending from the front of the ground plate 246. Each ground shield 208 includes a shield portion 260 and a transition portion 262 between the shield portion 260 and the ground plate 246. The shield portion 260 provides electrical shielding along the mating ends 272 (shown in FIG. 3) of the signal contacts 206 (shown in FIG. 3). The transition portion 262 includes a twist to orient the shield portion 260 at 45° relative to the ground plate 246. As such, the shield portion 260 is oriented complimentary to the mating ends 272 of the corresponding signal contacts 206. The shield portion 260 provides efficient shielding for the signal contacts 206 because both the shield portion 260 and the mating ends 272 are twisted 45°.

In the illustrated embodiment, the shield portion 260 of the ground shield 208 is C-shaped. The shield portion 260 includes an end wall 264 and side walls 266, 268 extending from the end wall 264. The transition portion 262 is connected to the end wall 264. The transition portion 262 is twisted such that the end wall 264 is angled at 45° relative to the ground plate 246. The twist axis is aligned with the ground plate 246 such that part of the end wall 264 is shifted to the right side of the ground plate 246 and part of the end wall 264 is shifted to the left side of the ground plate 246. The first side wall 266 is located at the right side of the ground plate 246 and the second side wall 266 is located at the left side of the ground plate 246. In an exemplary embodiment, the shield portion 260 is stamped such that the end wall 264 includes one or more ground fingers 265 and such that the side walls 266, 268 include one or more ground fingers 267, 269, respectively. The ground fingers 265, 267, 269 include mating interfaces. For example, the ground fingers 265, 267, 269 may be cupped or include bumps near distal ends of the ground fingers 265, 267, 269. The ground fingers 265, 267, 269 are deflectable. Optionally, the end wall 264 and/or the side walls 266, 268 may include dimples 263.

Figure 5:
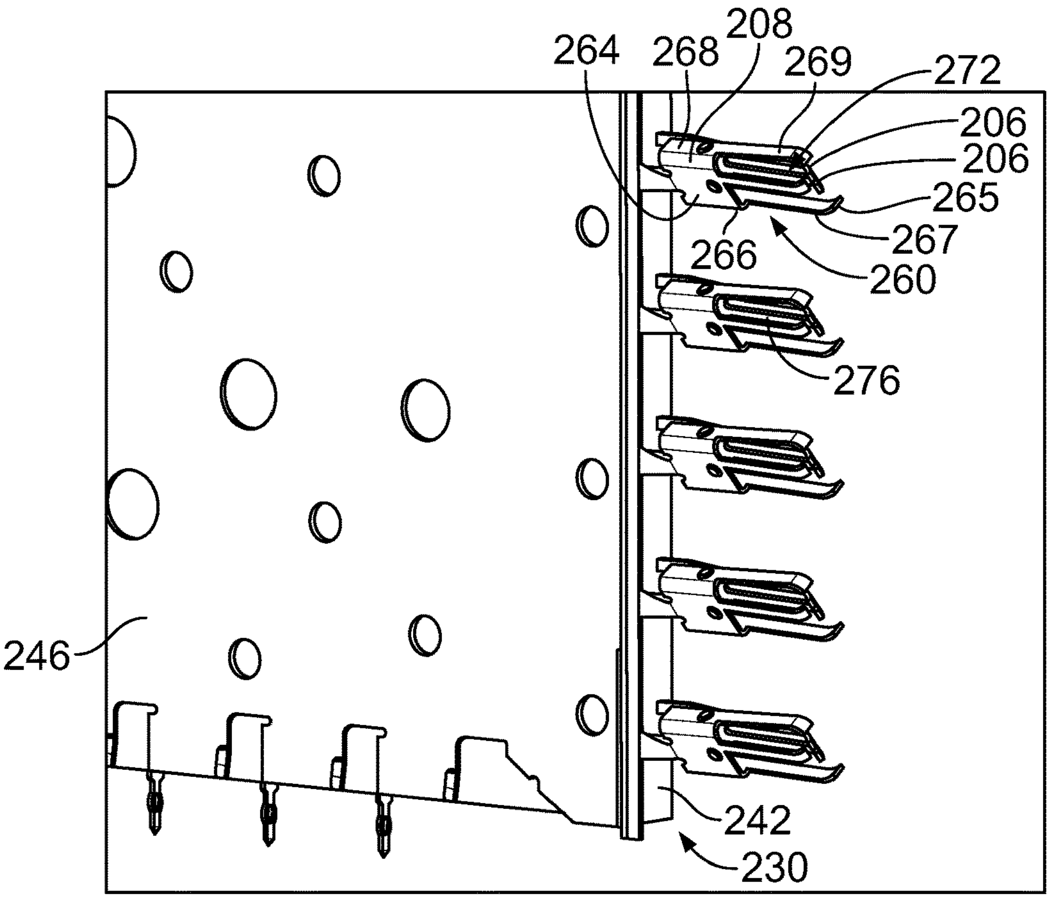
FIG. 5 is a side perspective view of a portion of the wafer assembly in accordance with an exemplary embodiment.
Figure 6:
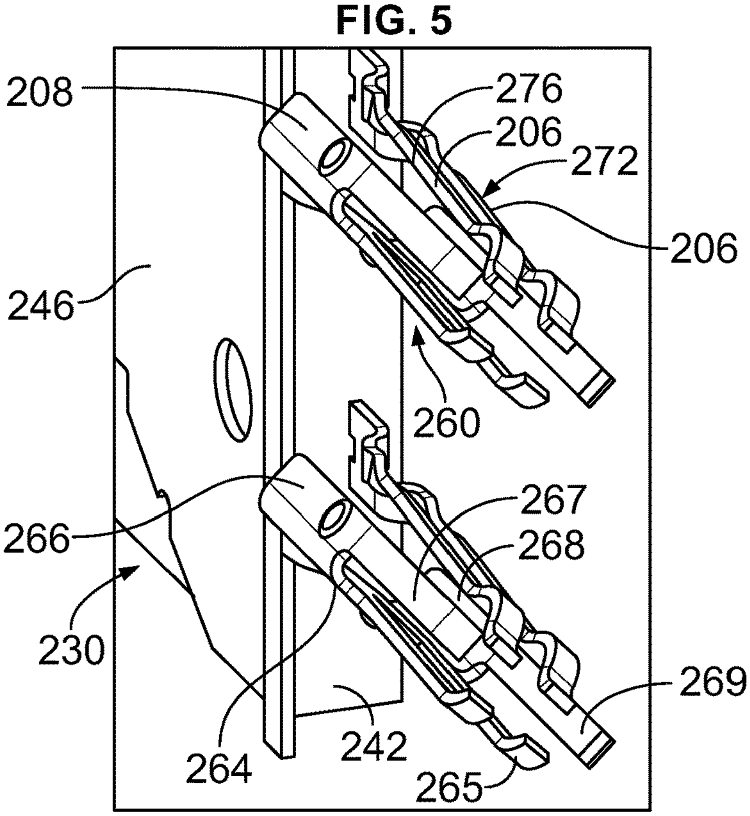
FIG. 6 is a front perspective view of a portion of the wafer assembly in accordance with an exemplary embodiment.

FIG. 5 is a side perspective view of a portion of the wafer assembly 230 in accordance with an exemplary embodiment. FIG. 6 is a front perspective view of a portion of the wafer assembly 230 in accordance with an exemplary embodiment. FIGS. 5 and 6 illustrate the ground shields 208 and the mating ends 272 of the signal contacts 206 twisted at 45°. The mating ends 272 form twisted mating interfaces for mating with the second signal contacts 306 (shown in FIG. 1). The ground shields 208 form twisted shield zones for the mating ends 272.

The ground plate 246 extends along one side of the wafer body 242. The ground shields 208 are similarly positioned along those same sides of the mating ends 272 of the signal contacts 206. The shield portions 260 of the ground shields provide shielding for the corresponding pair of signal contacts 206. By twisting both the signal contacts 206 and the ground shields 208, the ground shields 208 maintain generally uniform spacing relative to the signal contacts 206 along the signal paths (for example, along the mating ends 272 as well as along the main bodies 270). When twisted, the end wall 264 of the ground shield 208 is generally parallel to the mating ends 272 of the pair of signal contacts 206. The end wall 264 maintains generally uniform spacing from both spring beams 276 of the pair. The ground fingers 265 have generally uniform spacing from the spring beams 276 of the pair. The ground fingers 267, 269 of the side walls 266, 268 are spaced generally uniformly from the respective (closest) signal contact 206. The ground shields 208 provide efficient electrical shielding for both signal contacts 206 of the pair corresponding pairs.

Figure 7:
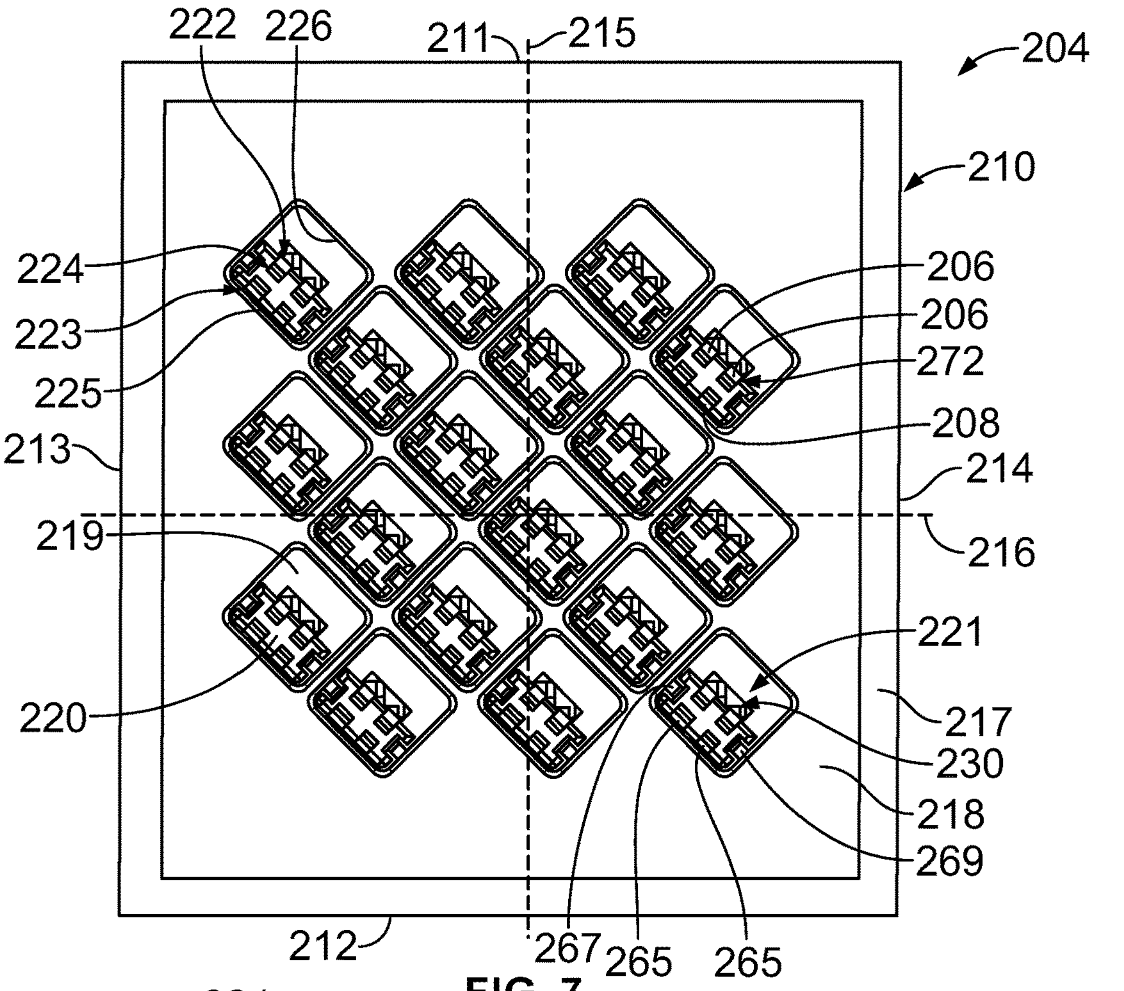
FIG. 7 is a front view of the first electrical connector in accordance with an exemplary embodiment.
Figure 8:
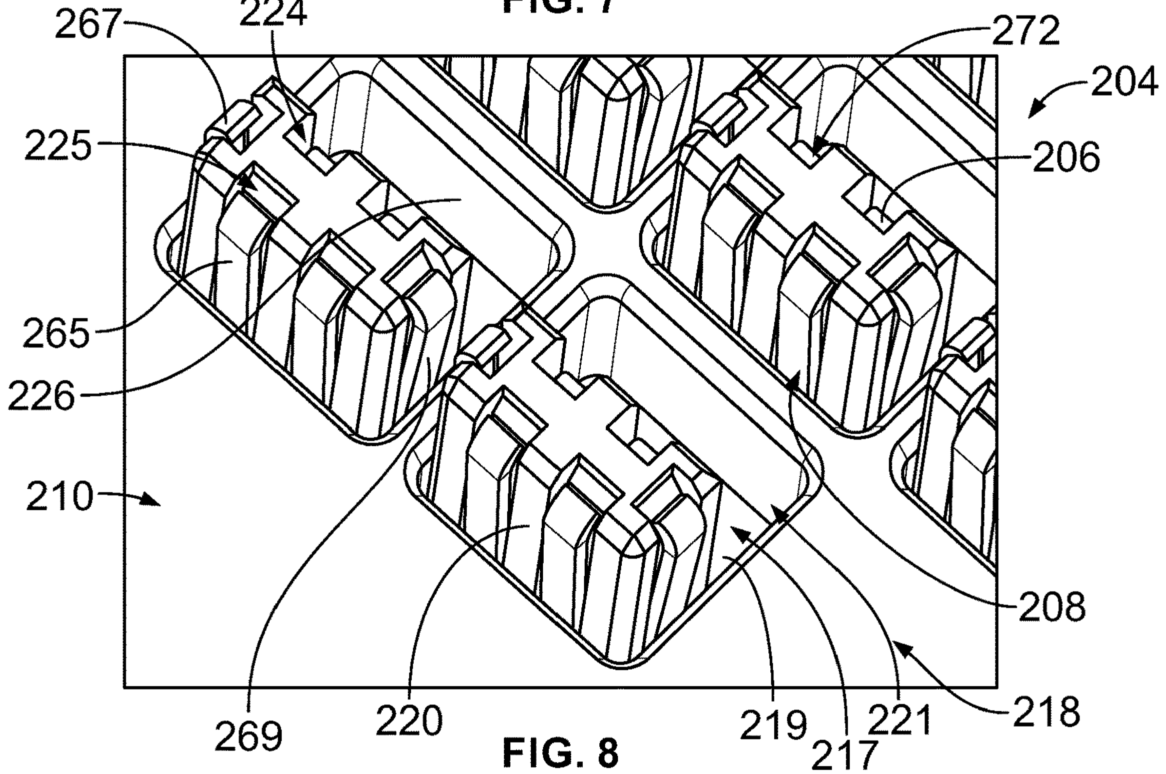
FIG. 8 is a front perspective view of a portion of the first electrical connector in accordance with an exemplary embodiment.

FIG. 7 is a front view of the first electrical connector 204 in accordance with an exemplary embodiment. FIG. 8 is a front perspective view of a portion of the first electrical connector 204 in accordance with an exemplary embodiment. The housing 210 holds the signal contacts 206 and the ground shields 208 for mating with the second electrical connector 304 (shown in FIG. 1). The housing 210 forms part of the mating interface with the second electrical connector 304.

The housing 210 has a top 211 and a bottom 212. The housing 210 is a first side 213 second side 214 opposite the first side 213. The housing 210 has a primary axis 215 extending from top 211 to bottom 212 and a secondary axis 216 extending from the first side 213 to the second side 214. The secondary axis 216 is perpendicular to the primary axis 215. In an exemplary embodiment, the mating ends 272 of the signal contacts 206 and the ground shields 208 are oriented at 45° relative to the primary axis 215 and relative to the secondary axis 216. The wafer assemblies 230 are received in the housing 210 such that the wafer assemblies 230 are oriented parallel to the primary axis 215 (centerlines of the wafer assemblies 230 are illustrated in phantom in FIG. 7).

In an exemplary embodiment, the housing 210 is a multi-piece housing including a contact organizer 217 and a commoning member 218. The commoning member 218 is at the front of the housing 210, such as forward of the contact organizer 217. The contact organizer 217 may include locating features for locating the commoning member 218 relative to the contact organizer 217. In an exemplary embodiment, the commoning member 218 faces the second electrical connector 304. The commoning member 218 is electrically conductive and is used to electrically common the ground frames 244 of each of the wafer assemblies 230. The commoning member 218 provides electrical shielding for the signal contacts 206 at the mating interface.

In an exemplary embodiment, the contact organizer 217 includes a base 219 in a plurality of towers 220 extending forward from the base 219. The towers 220 supports the signal contacts 206 and the ground shields 208. In an exemplary embodiment, the towers 220 extend into openings 221 in the commoning member 218. The towers 220 may pass entirely through the openings 221 and extend forward of the front of the commoning member 218. The towers 220 are configured to be received in corresponding openings in a commoning member of the second electrical connector 304. In an exemplary embodiment, the towers 220 are rectangular shaped; however, the towers 220 may have other shapes in alternative embodiments. The towers 220 are angled relative to the primary axis 215, such as at 45°.

The wafer assemblies 230 are coupled to the housing 210 rearward of the base 219. The signal contacts 206 and the ground shields 208 pass through the base 219 to extend along the towers 220. In an exemplary embodiment, the base 219 includes signal contact openings 222 and ground shield openings 223. The mating ends 272 of the signal contacts 206 extend through the signal contact openings 222. The mating ends 272 are received in signal contact pockets 224 of the towers 220. The signal contact pockets 224 locate the mating ends 272 relative to each other and relative to the ground shields 208. In an exemplary embodiment, the mating ends 272 are electrically isolated from each other and from the ground shields 208 by the dielectric material of the towers 220. The ground shields 208 extend through the ground shield openings 223 to the towers 220. The ground fingers 265, 267, 269 are received in ground finger pockets 225 of the towers 220. The ground finger pockets 225 locate the ground fingers 265, 267, 269 relative to each other and relative to the mating ends 272 of the signal contacts 206.

The commoning member 218 is manufactured from a conductive material. For example, the commoning member 218 may be a metal block having the openings 221 formed therethrough. In alternative embodiments, the commoning member 218 may be manufactured from a conductive plastic. In other various embodiments, the commoning member 218 may be a plated plastic structure having plating at the front and/or through the openings 221 and/or at the rear. The ground shields 208 are configured to be electrically connected to the commoning member 218. For example, the ground shields 208 may engage the commoning member 218 within the openings 221.

In an exemplary embodiment, the openings 221 pass entirely through the commoning member 218 and are defined by walls 226. In an exemplary embodiment, the openings 221 are rectangular. In the illustrated embodiment, the openings 221 are square shaped. However, the openings 221 may have other shapes. In alternative embodiments the openings 221 are oversized relative to the towers 220. For example, each opening 221 may be sized to receive two of the towers 220 (one from the first electrical connector 204 and one from the second electrical connector 304).

Figure 9:
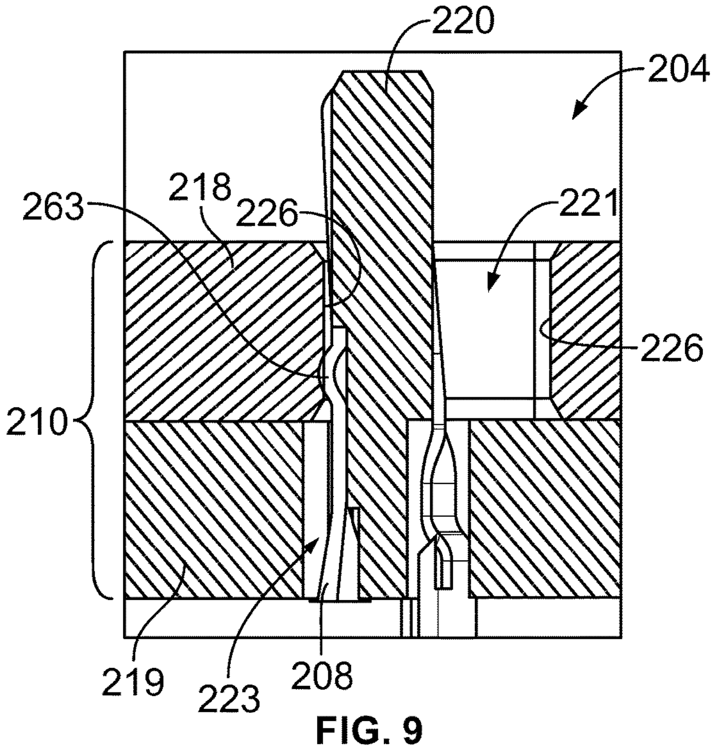
FIG. 9 is a cross-sectional view of a portion of the first electrical connector in accordance with an exemplary embodiment.

FIG. 9 is a cross-sectional view of a portion of the first electrical connector 204 in accordance with an exemplary embodiment. FIG. 9 illustrates one of the ground shields 208 received in the housing 210. The ground shield 208 is received in the ground shield opening 223 to pass through the base 219. The ground shield 208 extends along the tower 220. The tower 220 and the ground shield 208 extend into and through the opening 221 in the commoning member 218. In an exemplary embodiment, the dimple 263 engages the walls 226 within the opening 221 to electrically connect the ground shield 208 with the commoning member 218. The tower 220 engages or presses against the ground shield 208 to ensure electrical connection between the ground shield 208 and the commoning member 218.

Figure 10:
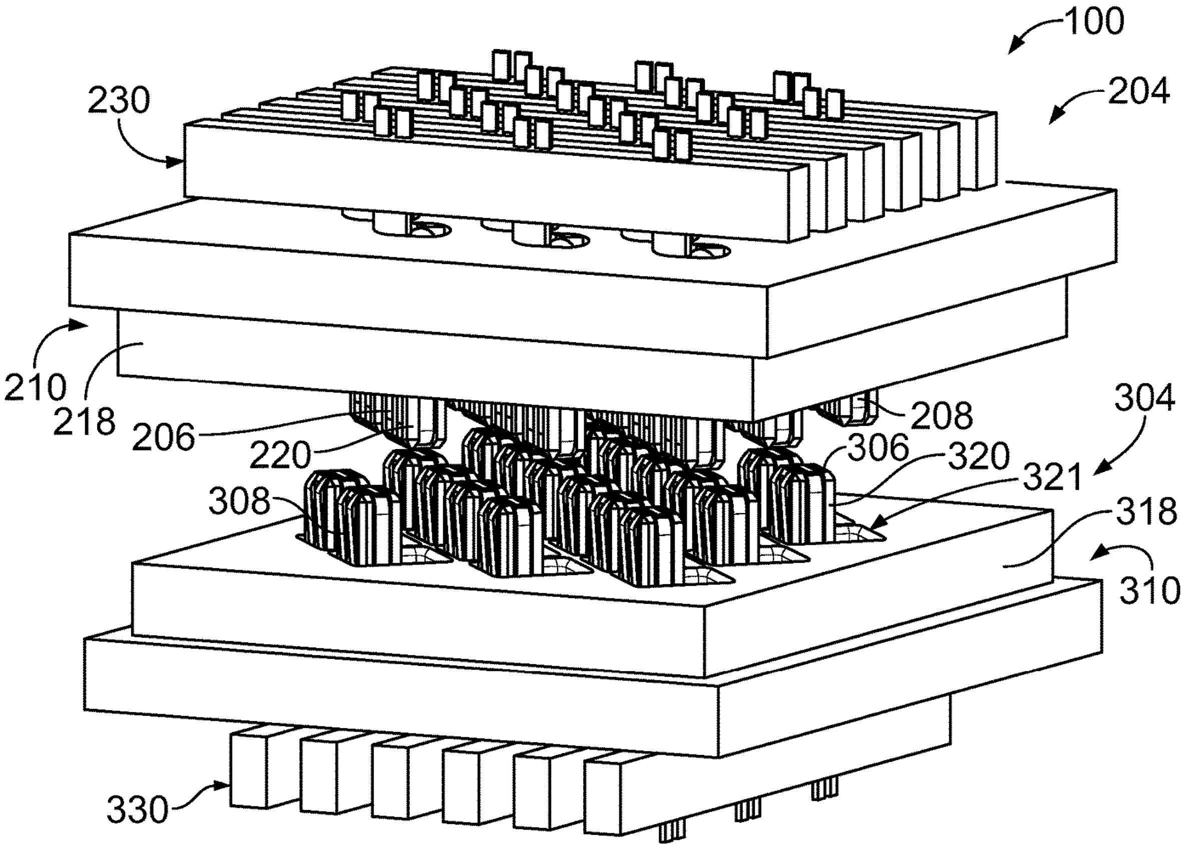
FIG. 10 illustrates a portion of the communication system showing the first electrical connector position for mating with the second electrical connector in accordance with an exemplary embodiment.

FIG. 10 illustrates a portion of the communication system 100 showing the first electrical connector 204 position for mating with the second electrical connector 304. In an exemplary embodiment, the mating interfaces of the first electrical connector 204 and the second electrical connector 304 are hermaphroditic and identical to each other. The signal contacts 206, 306 and the ground shields 208, 308 are each angled 45° to form an orthogonal mating interface.

At the mating interface, the towers 220 protrude forward from the housing 210, such as forward from the front of the commoning member 218. Similarly, towers 320 protrude forward from the housing 310 of the second electrical connector 304. The commoning member 218 faces a commoning member 318 of the second electrical connector 304. The first signal contacts 206 and the first ground shields 208 extend along the towers 220 of the first electrical connector 204. The towers 220 are aligned with openings 321 in the commoning member 318 of the second electrical connector 304. The towers 220 are configured to be received in the openings 321 in the commoning member 318 adjacent the towers 320 of the second electrical connector 304. The first signal contacts 206 and the first ground shields 208 are configured to be plugged into the openings 321 in the commoning member 318 with the towers 220. The first ground shields 208 are configured to be electrically connected to the commoning member 318 when the first ground shields 308 are plugged into the opening 321 in the commoning member 318.

The second signal contacts 306 and the second ground shields 308 extend along the towers 320 of the second electrical connector 304. The towers 320 are aligned with the openings 221 in the commoning member 218 of the first electrical connector 204. The towers 320 are configured to be received in the openings 221 in the commoning member 218 adjacent the towers 220 of the first electrical connector 204. The second signal contacts 306 and the second ground shields 308 are configured to be plugged into the openings 221 in the commoning member 218 with the towers 320. The second ground shields 308 are configured to be electrically connected to the commoning member 218 when the second ground shields 308 are plugged into the opening 221 in the commoning member 218.

When the electrical connectors 204, 304 are mated, the first signal contacts 206 are mated with the second signal contacts 306. The first signal contacts 206 transition 45° relative to the wafer assemblies 230 and the second signal contacts 306 transition 45° relative to corresponding wafer assemblies 330 of the second electrical connector 304. As such, the signal paths transition 90° from the first wafer assemblies 230 to the second wafer assemblies 330. The first and second ground shields 208, 308 provide shield zones along the mating ends of the signal contacts 206, 306. The first and second ground shields 208, 308 both transition 45° relative to the wafer assemblies 230, 330 to transition the shield zones with the mating ends of the signal contacts 206, 306. The ground shields 208, 308 provide electrical shielding through the shielded mating zone. Additionally, the first and second commoning members 218, 318 provide electrical shielding at the mating zone. Each of the first ground shields 208 are configured to be directly electrically connected to both the first and second commoning members 218, 318. Similarly, each of the second ground shields 308 are configured to be directly electrically connected to both the first and second commoning members 218, 318. The shielding continuous through the mating zone and generally uniformly spaced from the signal contacts 206, 306 through the mating zone. The continuous, uniform shielding enhances electrical performance of the communication system 100. The shielding reduces crosstalk and reduces return loss along the signal paths. The shielding provides impedance control along the signal paths.

Figure 11:
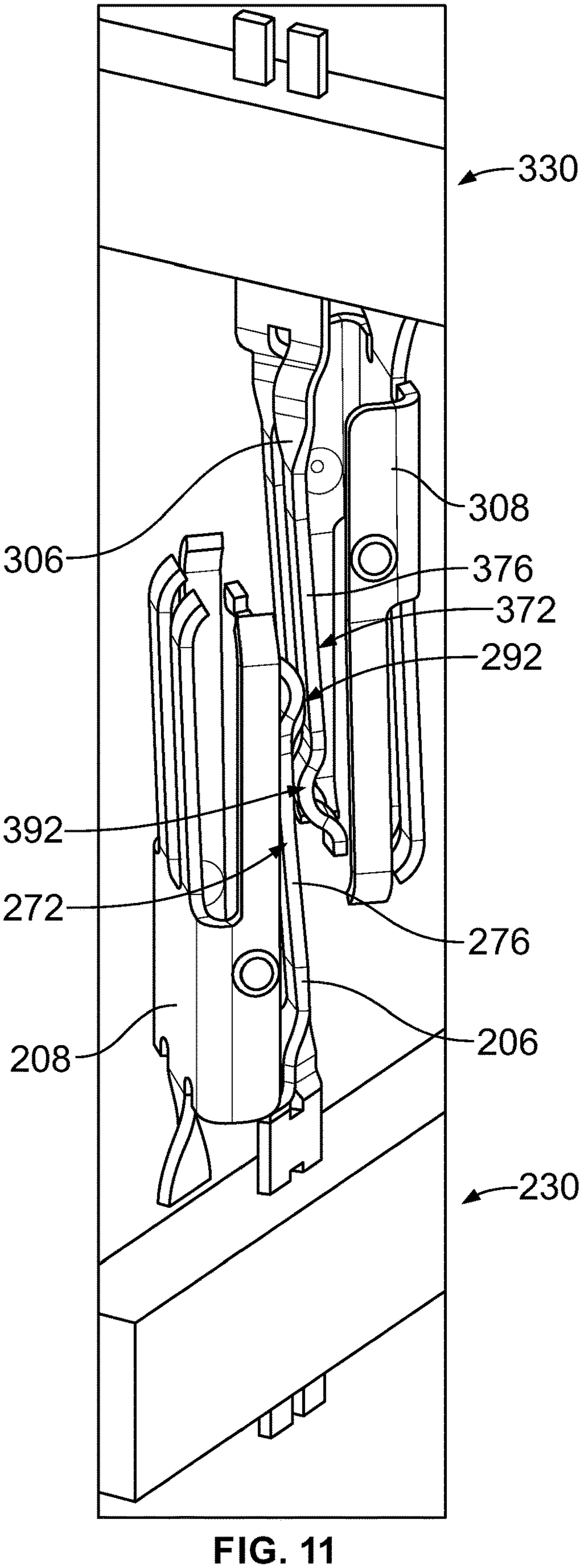
FIG. 11 is a sectional view of a portion of the communication system in accordance with an exemplary embodiment.

FIG. 11 is a sectional view of a portion of the communication system 100 in accordance with an exemplary embodiment. FIG. 11 illustrates the first and second signal contacts 206 and the first and second ground shields 208; however, the housing 210 (shown in FIG. 10) is removed to illustrate the mating interface. FIG. 11 illustrates a portion of the first wafer assembly 230 and a portion of the second wafer assembly 330. The wafer assemblies 230, 330 are oriented perpendicular to each other. The signal contacts 206, 306 are both twisted 45° to transition between the orthogonal wafer assemblies 230, 330. The ground shields 208, 308 are both twisted 45° to transition between the orthogonal wafer assemblies 230, 330. The ground shields 208, 308 provide electrical shielding at the mating zone.

The signal contacts 206 include the mating fingers 292 at the tips of the mating ends 272. Similarly, the signal contacts 306 include mating fingers 392 at the tips of mating ends 372 of the second signal contacts 306. When mated, the mating fingers 292 engage of spring beams 376 of the second signal contacts 306 and the mating fingers 392 engage the spring beams 276 of the first signal contacts 206. As such, the signal contacts 206, 306 have multiple points of contact with each other. The multiple points of contact along the length of the signal contacts 206, 306 reduce electrical stubs. The electrical stubs lengths are limited to the tips of the signal contacts 206, 306 and beyond the points of contact.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An electrical connector comprising:

a housing having a mating interface configured to be mated with a mating electrical connector; and wafer assemblies coupled to the housing and arranged in a wafer stack, each wafer assembly including a leadframe, a wafer body holding the leadframe, and a ground frame coupled to the wafer body to provide electrical shielding for the leadframe;

each leadframe having signal contacts extending between mating ends and mounting ends, the signal contacts having main bodies between the mating ends and the mounting ends, the main bodies extending through the wafer bodies, the mounting ends extending from the wafer body for termination to a circuit board, the mating ends extending from the wafer body and presented at the mating interface of the housing for mating with mating signal contacts of the mating electrical connector, the mating ends being twisted 45° relative to the main bodies to define twisted mating interfaces configured to be mated with the mating signal contacts of the mating electrical connector;

each ground frame having a ground plate coupled to the wafer body and ground shields extending forward from the ground plate, the ground shields extending along the mating ends of the corresponding signal contacts to provide shielding for the mating ends along the mating interfaces, the ground shields being twisted 45° relative to the ground plate to define twisted shield zones along the mating ends of the signal contacts.

2. The electrical connector of claim 1, wherein the housing and wafer assemblies form a hermaphroditic mating interface for mating with the mating electrical connector having a hermaphroditic mating interface identical to the hermaphroditic mating interface defined by the housing and the wafer assemblies.

3. The electrical connector of claim 1, wherein the signal contacts are arranged in pairs, each ground shield extends along the corresponding pair of the signal contacts.

4. The electrical connector of claim 1, wherein the signal contacts are arranged in pairs, the signal contacts being twisted such that one of the signal contacts of the pair is on a right side of a plane of the leadframe and the other of the signal contacts of the pair is on a left side of the plane of the leadframe.

5. The electrical connector of claim 1, wherein each signal contact has a first side and a second side opposite the first side, the first sides along the main bodies being coplanar, the second sides along the main bodies being coplanar, the first sides along the mating ends being oriented at 45° relative to the first sides along the main bodies, the second sides along the mating ends being oriented at 45° relative to the second sides along the main bodies.

6. The electrical connector of claim 5, wherein the ground shields are oriented generally parallel to and facing the first sides of the corresponding signal contacts along the mating ends.

7. The electrical connector of claim 1, wherein each ground shield is C-shaped having an end wall between two side walls, the end wall being oriented at 45° relative to the ground plate.

8. The electrical connector of claim 1, wherein each ground shield is C-shaped having an end wall between two side walls, the end wall being oriented generally parallel to the mating ends of the signal contacts.

9. The electrical connector of claim 1, wherein each ground shield is C-shaped having an end wall between two side walls, the ground shield includes a transition portion between the end wall and the ground plate, the transition portion being twisted 45° to orient the end wall 45° relative to the ground plate.

10. The electrical connector of claim 1, wherein each ground shield includes ground fingers extending parallel to the mating ends of the corresponding signal contacts and maintaining a generally uniform spacing with the mating ends of the corresponding signal contacts.

11. An electrical connector comprising:

a housing having a mating interface configured to be mated with a mating electrical connector, the housing including a contact organizer having signal contact openings and ground shield openings, the housing including a commoning member at the mating interface, the commoning member being conductive and providing electrical shielding at the mating interface, the commoning member having openings aligned with the ground shield openings; and wafer assemblies coupled to the housing and arranged in a wafer stack, each wafer assembly including a leadframe, a wafer body holding the leadframe, and a ground frame coupled to the wafer body to provide electrical shielding for the leadframe;

each leadframe having signal contacts extending between mating ends and mounting ends, the signal contacts having main bodies between the mating ends and the mounting ends, the main bodies extending through the wafer bodies, the mounting ends extending from the wafer body for termination to a circuit board, the mating ends extending from the wafer body into corresponding signal contact openings of the contact organizer, the mating ends being presented at the mating interface of the housing for mating with mating signal contacts of the mating electrical connector, the mating ends being twisted 45° relative to the main bodies to define twisted mating interfaces configured to be mated with the mating signal contacts of the mating electrical connector;

each ground frame having a ground plate coupled to the wafer body and ground shields extending forward from the ground plate, the ground shields being received in corresponding ground shield openings of the contact organizer and extending into the corresponding opening in the commoning member, the ground shields being electrically connected to the commoning member such that each of the ground shields are electrically commoned by the commoning member, the ground shields extending along the mating ends of the corresponding signal contacts to provide shielding for the mating ends along the mating interfaces, the ground shields being twisted 45° relative to the ground plate to define twisted shield zones along the mating ends of the signal contacts.

12. The electrical connector of claim 11, wherein the housing and wafer assemblies form a hermaphroditic mating interface for mating with the mating electrical connector having a hermaphroditic mating interface identical to the hermaphroditic mating interface defined by the housing and the wafer assemblies.

13. The electrical connector of claim 11, wherein the commoning member includes a front at the mating interface, the ground shields extending forward of the front of the commoning member, distal ends of the ground shields are configured to be received in openings of a commoning member of the mating electrical connector.

14. The electrical connector of claim 11, wherein the contact organizer includes a base and towers extending forward from the base, the signal contact openings passing through the base, the towers including signal contact pockets aligned with the signal contact openings to receive the mating ends of the signal contacts, the towers being received in the openings in the commoning member to electrically isolate the signal contacts from the commoning member.

15. The electrical connector of claim 14, wherein the ground shield openings pass through the base, the towers including ground shield pockets aligned with the ground shield openings to receive the ground shields, the towers holding the ground shields in electrical contact with the commoning member.

16. The electrical connector of claim 14, wherein the openings in the commoning member are sized to receive the towers and to receive towers of the mating electrical connector such that the mating ends of the signal contacts are electrically connected to the mating signal contacts in a mating zone defined within the openings of the commoning member.

17. A communication system comprising:

a first circuit board assembly having a first circuit board and a first electrical connector mounted to the first circuit board, the first electrical connector having first signal contacts and first ground shields providing electrical shielding for the first signal contacts at mating ends of the first signal contacts, wherein the first signal contacts are twisted 45° at the mating ends thereof to form twisted mating interfaces and the first ground shields are twisted 45° to form twisted shield zones; and a second circuit board assembly having a second circuit board and a second electrical connector mounted to the second circuit board, the second electrical connector having second signal contacts and second ground shields providing electrical shielding for the second signal contacts at mating ends of the second signal contacts, wherein the second signal contacts are twisted 45° at the mating ends thereof to form twisted mating interfaces and the second ground shields are twisted 45° to form twisted shield zones;

wherein the first and second electrical connectors are identical to each other each having a hermaphroditic mating interface defined by the first and second signal contacts and the first and second ground shields;

wherein the first and second electrical connectors are mated such that the first circuit board is oriented perpendicular to the second circuit board.

18. The communication system of claim 17, wherein the first electrical connector includes first wafer assemblies held in a first wafer stack in a first housing and the second electrical connector includes second wafer assemblies held in a second wafer stack in a second housing, the first wafers oriented along first planes, the second wafers oriented along second planes perpendicular to the first planes, the first signal contacts being twisted 45° relative to the first planes at the mating ends thereof, the second signal contacts being twisted 45° relative to the second planes at the mating ends thereof, the first ground shields being twisted 45° relative to the first planes, and the second ground shields being twisted 45° relative to the second planes.

19. The communication system of claim 17, wherein the first housing includes a first contact organizer having signal contact openings and ground shield openings and a first commoning member having openings aligned with the ground shield openings of the first contact organizer, the first commoning member being conductive and providing electrical shielding at the mating interface, and wherein the second housing includes a second contact organizer having signal contact openings and ground shield openings and a second commoning member having openings aligned with the ground shield openings of the second contact organizer, the second commoning member being conductive and providing electrical shielding at the mating interface;

wherein the openings of the second commoning member are aligned with the openings of the first commoning member to form mated openings, each mated opening receive a pair of the first signal contacts and a pair of the second signal contacts mated with the pair of the first signal contacts, each mated opening receiving the first ground shield corresponding with the pair of the first signal contacts and the second ground shield corresponding with the pair of the second signal contacts, the first and second ground shields being electrically connected to both the first and second commoning members within the corresponding mated opening.

* * * * *